United States Patent [19]

Brandt et al.

[11] Patent Number: 4,582,900
[45] Date of Patent: Apr. 15, 1986

[54] WATER-SOLUBLE MIXED ETHERS OF β-CYCLODEXTRIN AND A PROCESS FOR THEIR PREPARATION

[75] Inventors: Lothar Brandt, Wiesbaden; Utz-Hellmuth Felcht, Bad Soden-Neuenhain, both of Fed. Rep. of Germany

[73] Assignee: Hoechst Aktiengesellschaft, Frankfurt am Main, Fed. Rep. of Germany

[21] Appl. No.: 682,414

[22] Filed: Dec. 14, 1984

[30] Foreign Application Priority Data

Dec. 17, 1983 [DE] Fed. Rep. of Germany ....... 3345780

[51] Int. Cl.[4] .............................................. C08B 37/16
[52] U.S. Cl. .................................................. 536/103
[58] Field of Search ....................................... 536/103

[56] References Cited

U.S. PATENT DOCUMENTS

| | | | |
|---|---|---|---|
| 3,426,011 | 2/1969 | Parmerter et al. | 536/103 |
| 3,453,257 | 7/1969 | Parmerter et al. | 536/46 |
| 3,453,258 | 7/1969 | Parmerter et al. | 536/46 |
| 3,459,731 | 8/1969 | Gramera et al. | 536/103 |

FOREIGN PATENT DOCUMENTS

| | | |
|---|---|---|
| 1493047 | 1/1973 | Fed. Rep. of Germany . |
| 2704776 | 8/1977 | Fed. Rep. of Germany . |
| 6883/79 | 1/1979 | Fed. Rep. of Germany . |
| 3118218 | 4/1982 | Fed. Rep. of Germany . |
| 3130502 | 6/1982 | Fed. Rep. of Germany . |
| 1204376 | 1/1960 | France . |
| 1548917 | 12/1968 | France . |
| 57-47301 | 3/1982 | Japan . |
| 58-210901 | 12/1983 | Japan ......... 536/46 |
| 59-26142 | 2/1984 | Japan ......... 536/103 |
| 895429 | 5/1962 | United Kingdom . |

OTHER PUBLICATIONS

Chemical Abstracts, vol. 100, No. 26, Jun. 25, 1984, 100:211126s.
Saenger, "Cyclodextrin–Einschlussverbindungen in Forschung und Industrie", *Angew, Chem.* 92, 343–361 (Verlag Chemie, Weinheim, DE, 1980); p. 354 is pertinent.
Croft and Bartsch, "Synthesis fo Chemically Modified Cyclodextrins", *Tetrahedron*, vol. 39, No. 9, pp. 1417 to 1474 (Pergamon Press, GB, 1983); pp. 1427 to 1434.
Casu et al., "Conformation of O–Methylated Amylose and Cyclodextrins", *Tetrahedron*, vol. 24, pp. 803 to 821, (Pergamon Press, GB, 1968); pp. 803 to 813.
Bergeron et al., "Complex Formation between Mycobacterial Ploysaccharides or Cyclodextrins and Palmitoyl Coenzyme-A", *J. Biological Chemistry*, vol. 250, No. 4, pp. 1223 to 1230 (1975).
Weidenhoff et al., "Properties of Cyclodextrins, Part III, Cyclodextrin-Epichlorhydrin Resins: Preparation and Analysis", *Die Starke*, 21st year, No. 5, pp. 119 to 123 (1969); pp. 120–122.
Lammers et al., "Properties of Cyclodextrins, Part VI, Water Soluble Cyclodextrin–Derivatives, Preparation and Analysis", *Die Starke*, 23rd yr., No. 5, pp. 167 to 171 (1971).
Takeo et al., "Synthesis of Heptakis (2-O-methyl)-β-Cycladextrin", *Die Starke*, 28th yr., No. 7, pp. 226, 227, (1976).
Szejtle et al., "Synthesis and $^{13}$C–NMR Spectroscopy of Methylated β–Cyclodextrins", *Starch/ Starke*, 32 rd yr., No. 5, 165 to 169 (1980).
Szejtle et al.,"Method for the Preparation of Tablets which Rapidly Disintegrate in an Aqueous Medium", published PCT Application No. WO83/00809.

*Primary Examiner*—Ronald W. Griffin
*Attorney, Agent, or Firm*—Berman, Aisenberg & Platt

[57] ABSTRACT

The invention relates to novel water-soluble mixed ethers of β-cyclodextrin (β-CD) with ether substituents comprising ($C_1$ and $C_2$) alkyl, hydroxy($C_2$ to $C_4$)alkyl and carboxy($C_1$ and $C_2$)alkyl such as methylhydroxyethyl-β-CD or hydroxyethyl-carboxy-methyl-β-CD; hydroxyethyl-hydroxy propyl ethers are excepted.

The process of the invention comprises reacting β-cyclodextrin with at least two different alkylating, hydroxyalkylating and/or carboxyalkylating etherifying agents (for example, methyl chloride, ethylene oxide and/or chloroacetic acid) in a basic, liquid reaction medium containing an alkali-metal hydroxide, water and, optionally, at least one organic solvent (for example, dimethoxyethane or isopropanol).

20 Claims, No Drawings

WATER-SOLUBLE MIXED ETHERS OF β-CYCLODEXTRIN AND A PROCESS FOR THEIR PREPARATION

RELATED APPLICATION

This application is related to copending application Ser. No. 682,413, filed Dec. 14, 1985, the entire disclosure of which is incorporated herein by reference.

FIELD OF THE INVENTION

The present invention relates to a new class of compounds, mixed ethers of β-cyclodextrin, and to a process for their preparation.

BACKGROUND

β-Cyclodextrin (β-CD) is a cyclic oligosaccharide consisting of 7 glucose units which are joined by α-1,4 linkages:

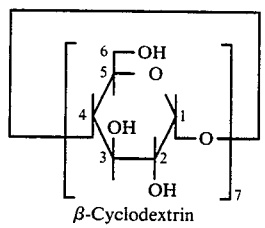

β-Cyclodextrin

It is obtained as a result of an enzymatic degradation of starch, during which a predominant amount of β-CD is formed, apart from α-cyclodextrin (composed of 6 glucose units) and γ-cyclodextrin (composed of 8 glucose units). As far as the chemical and physical-chemical properties of this class of compounds are concerned, reference is made to "Cyclodextrin-Einschlussverbindungen in Forschung und Industrie" (Cyclodextrin inclusion compounds in research and industry) [I] by W. Saenger, published in Angew. Chemie. 92, pp. 343 to 361 (1980), Verlag Chemi-Weinheim (DE) and to "Synthesis of Chemically Modified Cyclodextrins" [II] by A. P. Croft and R. A. Bartsch, published in Tetrahedron, Vol. 39, No. 9, pp. 1417 to 1474 (1983), Pergamon Press (GB). For the etherification reaction, a maximum of 3 OH groups are available per anhydro-D-glucose unit in the β-cyclodextrin, i.e., the maximum number of OH groups per β-cyclodextrin molecule is 21. Since known ethers of β-cyclodextrin have primarily been synthesized as structurally well-defined compounds, they are generally ethers where one, two or the three OH groups of the carbon atoms 2, 3, and 6 of each anhydro-D-glucose salt unit are deliberately substituted; the degree of substitution (DS) of these compounds is then 1, 2 or 3. In principle, any intermediate degree is also possible, if the etherification proceeds in a statistical manner to give mixtures of compounds. Substitution of one OH group in the β-cyclodextrin molecule results in an ether group (a DS of about 0.14). When there is such a low degree of etherification, some molecules are not etherified at all, whereas others are substituted at two or more OH groups. For practical purposes it is therefore reasonable to assume that at a DS of 0.3 of higher at least one OH group of each molecule is actually substituted.

The following ethers of β-cyclodextrin are known from prior art:

In the first of the cited references [I] (p. 354), the methyl, sodium carboxymethyl and dihydroxypropyl ethers of β-cyclodextrin are specifically mentioned; methods for their preparation are not described.

Apart from various methyl ethers of β-cyclodextrin, the second of the cited publications [II] specifically mentions and describes the preparation of ethers which (at their carbon atoms 2 and 6) possess benzyl, allyl or vinyl groups and (at their carbon atoms 3) possess methyl groups; furthermore carboxymethyl and carboxyethyl ethers, cyanoethyl and sulfoethyl ethers are described (in particular on pages 1427 et seq.) The last-mentioned compounds are also described in U.S. Pat. No. 3,453,258 and in U.S. Pat. No. 3,426,011. The latter of these two patents provides a process variant (for the preparation of carboxymethyl ethers of β-cyclodextrin) in which etherification is performed in the presence of an organic solvent (isopropanol) and an aqueous NaOH solution.

Hydroxyethyl and hydroxypropyl ethers and also a hydroxyethyl-hydroxypropyl mixed ether of β-CD are referred to by U.S. Pat. No. 3,459,731.

In "Conformation of O-methylated Amylose and Cyclodextrins" [III], in Tetrahedron, Vol. 24, pp. 803 to 821 (1968), Pergamon Press, B. Casu et al. describe (a) methyl-β-CD (DS about 2) which is disubstituted at the carbon atoms 2 and 6 and is obtained by reacting β-CD with dimethyl sulfate in a dimethylformamide (DMF)/dimethyl sulfoxide (DMSO) mixture, in the presence of BaO, and (b) trisubstituted methyl-β-CD (DS about 3), which is obtained by reacting β-CD with methyl iodide in DMSO, in the presence of BaO.

In "Complex Formation between Mycobacterial Polysaccharides or Cyclodextrins and Palmitoyl Coenzyme A" [IV], published in The Journal of Biological Chemistry, Vol. 250, No. 4, pp. 1223 to 1230 (1975), R. Bergeron et al. describe (a) C-2 and C-6 disubstituted methyl β-CD and propyl-β-CD which are produced by reacting β-CD with dimethyl sulfate or dipropyl sulfate, respectively, in a DMF/DMSO mixture, in the presence of BaO and Ba(OH)₂; (b) C-3 or C-6 monosubstituted methyl-β-CD (DS about 1 or about 0.7), which are produced by reacting β-CD provided with protective groups with methyl iodide or diazo methane; and (c) trisubstituted methyl-β-CD which is produced by reacting disubstituted methyl-β-CD with methyl iodide in a DMF/DMSO mixture in the presence of sodium hydride.

In "Properties of Cyclodextrins/Part III/Cyclodextrin-Epichlorohydrin Resins: Preparation and Analysis" [V], published in Die Stärke (Starch), 21st year, No. 5, pp. 119 to 123 (1969), N. Wiedenhof et al. describe the preparation of β-CD epichlorohydrin polymer beads and the corresponding water-soluble resins by reacting β-CD with the bifunctionally reactive epichlorohydrin in methyl isobutyl ketone, in the presence of an aqueous 30% or 16% strength NaOH solution and NaBH₄.

In "Properties of Cyclodextrins/Part VI/Water-Soluble Cyclodextrin-Derivatives, Preparation and Analysis" [VI], published in Die Stärke, 23rd year, No. 5, pp. 167 to 171 (1971), J. Lammers et al. describe the preparation of (a) sodium carboxymethyl-β-CD (DS about 0.45) by reacting β-CD with monochloroacetic acid in a 30% strength aqueous NaOH solution, in the presence of NaBH₄, and (b) sodium sulfopropyl-β-CD (DS about 0.9) by reacting β-CD with propanesultone in a 40% strength aqueous NaOH solution.

In "Synthesis of Heptakis (2-O-methyl-β-cyclodextrin" [VII], published in Die Stärke, 28th year, No. 7, pp. 226/227 (1976), K. Takeo et al. describe the preparation of methyl-$\beta$-CD which is only substituted at the carbon atom 2 (DS about 1) and is obtained by methylating the C-6 brominated $\beta$-CD with dimethylsulfate in DMF, in the presence of BaO and Ba(OH)$_2 \times$8H$_2$O, and splitting off the bromine substituent.

In "Synthesis and $^{13}$C-NMR Spectroscopy of Methylated $\beta$-Cyclodextrins" [VIII], published in "Starch/Stärke", 32nd year, No. 5, pp. 165 to 169 (1980), J. Szejtli et al. describe the preparation of (a) the trisubstituted methyl-$\beta$-CD by reacting $\beta$-CD with methyl iodide in dry DMSO or DMF, in the presence of sodium hydride, and (b) C-2 and C-6 disubstituted methyl-$\beta$-CD by reacting $\beta$-CD with dimethyl sulfate in a mixture of DMSO and DMF, in the presence of BaO and Ba(OH)$_2 \times$8H$_2$O.

JP-A No. 6883/79 describes liquid crystal elements which contain, for example, derivatives of $\beta$-CD as a cyclic oligosaccharide, whereby, in accordance with the general formula indicated in that publication, a great number of different hydroxyalkyl ethers or aminoalkyl ethers are said to be possible. The only derivative of $\beta$-CD specifically mentioned in the specification is hydroxypropyl-$\beta$-CD. DE-A No. 27 04 776 relates to similar subject matter, but in that patent publication, too, only hydroxypropyl-$\beta$-CD is specifically mentioned.

WO-A No. 83/00809 refers to the use of swellable $\beta$-cyclodextrin derivatives in tablets, whereby the derivatives are obtained from $\beta$-CD by reacting it with bifunctionally-reactive compounds, such as epichlorohydrin, in an aqueous-alkaline medium. The preparation of this type of derivative is also known from DE-B No. 14 93 047 or, with the addition of cellulose, from DE-A No. 31 30 502.

The water-soluble inclusion complexes according to DE-A No. 31 18 218 are formed from methyl-$\beta$-CD and biologically-active organic compounds (for example, vitamins or steroid hormones) and are said to contain a "partially methylated $\beta$-cyclodextrin", i.e., a molecule in which at least one and not more than 20 hydroxyl groups are etherified (DS about 0.14 to about 2.86). The methyl-$\beta$-CD types are said to consist either of homogeneous molecules or of mixtures of molecules of different degrees of substitution, preference being given to a methyl-$\beta$-CD which (on an average) is disubstituted, i.e., has a DS of about 2. As far as the preparation of the derivatives is concerned, the publication refers to the previously-mentioned references.

In the recent past $\beta$-cyclodextrin has gained more and more in importance because processes have apparently been developed which permit cost-advantageous production on a large industrial scale.

SUMMARY OF THE INVENTION

It is the object of the instant invention to synthesize novel, water-soluble ethers of $\beta$-cyclodextrin, which carry at least two different types of ether substituents (mixed ethers) and to provide a process for their production.

The invention relates to water-soluble mixed ethers of $\beta$-cyclodextrin, which carry ether substituents including C$_1$ and C$_2$ alkyl, hydroxy(C$_2$ to C$_4$)alkyl and carboxy(C$_1$ or C$_2$)alkyl, with the exception of hydroxyethyl-hydroxypropyl ethers. The invention particularly relates to mixed ethers of $\beta$-cyclodextrin which possess a methyl, hydroxyethyl, hydroxypropyl and/or carboxymethyl group as the ether substituents, with the exception of those mixed ethers of $\beta$-cyclodextrin which possess both a hydroxyethyl group and a hydroxypropyl group, but no other groups. The invention furthermore relates to a process (for the preparation of these ethers) in which $\beta$-cyclodextrin is reacted with at least two different alkylating, hydroxyalkylating and/or carboxyalkylating etherifying agents in a basic, liquid reaction medium containing an alkali-metal hydroxide, water and, optionally, at least one organic solvent.

DETAILS

The term "water-soluble" herein means that, at room temperature (about 20° C.), the process product is water soluble to at least 10% by weight, in particular to at least 15% by weight, i.e., at least this percentage of the product is contained in a saturated solution. The preferred organic solvents include dialk(C$_1$ to C$_3$)oxyethanes, [dialkyl(C$_1$ to C$_3$)glycols], C$_2$ to C$_5$ alkanols, (C$_1$ to C$_4$)alkoxy(C$_2$ or C$_3$)alkanols and aliphatic ketones, in particular dimethoxyethane, isopropanol, tert. butanol, acetone and/or methylethyl ketone, which are miscible with water. These organic solvents, which are employed alone or in a mixture of two or more, are optionally present in the etherifying mixture apart from water.

The process of this invention is performed in one of the known aggregates (for example, stirring tub). When the temperature level of the reaction mixture is higher than the boiling point of the mixture of organic solvent/H$_2$O, it is advisable to carry out the process according to the invention in pressure apparatus; it is also customary to carry out the reaction in a pressure apparatus when reactants, which are already in a gaseous state under normal conditions (standard pressure, room temperature), are used. This occurs, for example, when ethylene oxide is employed as the etherifying agent.

The alkali-metal hydroxide employed is usually NaOH (KOH and LiOH are optional alternatives) in solid form or in dissolved form, e.g., as an aqueous alkali-metal hydroxide solution, such as a 10 to 50% (by weight) strength solution. From 1 to 30 parts by weight of organic solvent are preferably used per 1 part by weight of $\beta$-CD, and the alkali-metal hydroxide is generally employed in an amount of from 1.5 to 50 moles, particularly of from 3 to 40 moles, per 1 mole of $\beta$-CD. When organic solvent is used, the proportion of water in the reaction mixture is advantageously within a range of from 3 to 50%, relative to the weight of the liquid organic solvent/water mixture; when no organic solvent is employed, the proportion of water varies between 0.1 and 3.0 parts by weight per 1 part by weight of $\beta$-CD. The preferred etherifying agents are C$_1$ and C$_2$ alkyl chlorides, C$_2$ to C$_4$ alkylene oxides and/or C$_2$ and C$_3$ chloroalkane acids or the salts or hydrolyzable esters thereof, whereby particular preference is given to methyl chloride, ethyl chloride, ethylene oxide, propylene oxide and/or monochloroacetic acid or to a corresponding salt or an ester. The total proportion of etherifying agents, which under the given conditions are only monofunctionally reactive in all cases, generally varies between 3 and 90 moles, particularly between 5 and 80 moles, per 1 mole of $\beta$-CD. In order to ensure a statistical DS of about 0.3 for each substituent, at least 2.5 moles of each etherifying agent are required.

With the exception of hydroxyethyl-hydroxypropyl-$\beta$-CD, all mixed ethers which form during the etherifying reaction are novel. They include, inter alia, methyl-hydroxyethyl-$\beta$-CD, methyl-hydroxypropyl-$\beta$-CD, ethyl-hydroxyethyl-$\beta$-CD, hydroxyethyl-carboxymethyl-β-CD and methyl-hydroxyethylcarboxymethyl-β-CD, mixed ethers on a methyl-β-CD basis being preferred; these compounds have statistical degrees of substitution (DS) of between about 0.6 and 2.5 and are composed of uniformly structured molecules or of mixtures of molecules with different degrees of substitution and different distribution of substituents, i.e., in the latter case the degree of substitution only denotes a statistical average value. The figures indicating the degree of substitution (DS) relate to the total number of substituted OH groups and thus to all types of ether substituents.

For performing the process in accordance with the present invention, it is expedient to mix the β-CD with the mixture of organic solvent, water and alkali-metal hydroxide first and then to add the etherifying agent in one or several step(s). This means that the mixed etherification process is either performed in one single step in the presence of at least two different etherifying agents or in two or more steps in the presence of at least one etherifying agent per step. The respective reaction mixtures and vessels are optionally flushed or purged with inert gas, such as nitrogen, in order to prevent oxidative side reactions. The etherifying reaction is particularly successfully conducted at temperatures between 30° C. and 130° C., depending on the reactivity of the employed etherifying agent. The time required for the etherifying reactions generally varies between 20 minutes and 8 hours, depending on the reaction temperature. In a separating device (for example, a centrifuge or a distillation apparatus), the crude product is first freed from the liquid components after adding precipitating agents of changing the temperature and preferably after adding acid until unconsumed bases have been neutralized. The product is then optionally purified by extraction of salts formed as by-products and subjected to a drying process.

The ethers of β-cyclodextrin, which are prepared in accordance with the process of this invention, are employed in known fields of application, for example, for the production of inclusion compounds Standard reagents are useful in the process according to the invention, so that, with respect to ecology and economy, it presents advantages over previously employed processes for producing single ethers, i.e., ethers having only one type of substituent.

In the Examples which follow, parts by weight are related to parts by volume as kg to dm$^3$; percentages relate to weight. "DS" designates the degree of substitution, i.e. the average number of substituted OH groups per anhydrdo-D-glucose unit; in the case of mixed ethers of β-CD it is within a range of from 0.28 to 3.0. The "MS" is the molar degree of substitution, i.e., the average number of moles of the substituting reagent which have been bonded by an ether linkage per mole of anhydro-D-glucose unit; in the case of β-CD mixed ethers it can even be greater than 3.0; it is normally used instead of the DS in order to characterize those substituents on the β-CD ether which may be formed by multiple substitution at an OH group, for example, in the case of the hydroxyalkyl substituent, because the resulting OH groups of the hydroxyalkyl groups can also be substituted—like the OH groups of the β-CD itself.

EXAMPLE 1

1 part by weight (p.b.w.) of β-CD (commercially available as a 97% strength product) is mixed with 2.4 p.b.w. of a 50% strength aqueous NaOH solution in an autoclave having an agitator; 3.0 p.b.w. of methyl chloride and 0.35 p.b.w. of ethylene oxide are then added thereto at room temperature. The mixture is allowed to react for 1 hour at 50° C. and for another 1.5 hours at 85° C. After the reaction product has been cooled down and excess methyl chloride has been evaporated, the practically neutral reaction mixture is freed by distillation, from volatile by-products, such as methanol, dimethyl ether, etc. The bulk of the sodium chloride formed is filtered off, and the filtrate which (apart from remaining salt) contains the product is passed through an ion exchange combination and then lyophilized. The remaining purified methyl-hydroxyethyl-β-CD has an average methyl DS of 1.2 and a hydroxyethyl MS of 0.31. It is very readily water-soluble.

EXAMPLE 2

1 p.b.w. of β-CD is suspended in 8 parts by volume (p.b.v.) of isopropanol and mixed with 1.9 p.b.w. of a 22% strength aqueous NaOH solution; then 0.4 p.b.w. of monochloracetic are added. In an agitator-containing autoclave 0.8 p.b.w. of ethylene oxide is added to the mixture, which is then allowed to react for 3 hours at 70° C. When the mixture has cooled down, it is neutralized with acetic acid, the solvent is distilled off, and dialysis against water is performed. The purified aqueous dialyzate is lyophilized. Hydroxyethyl-carboxymethyl-β-CD (in sodium-salt form), which has an average hydroxyethyl MS of 1.3 and a carboxymethyl DS of 0.36, is thus obtained.

EXAMPLE 3

1 p.b.w. of β-CD is suspended in 10 p.b.v. of dimethoxyethane and mixed with 2.8 p.b.w. of a 50% strength aqueous NaOH solution. 0.5 p.b.w. of monochloroacetic is added; then 2.2 p.b.w. of methyl chloride and 1.4 p.b.w. of propylene oxide are added in an agitator-containing autoclave. The mixture is heated to 60° C. and allowed to react for 1 hour; then the reaction is finished within another 4 hours at 85° C. After it has cooled down and excess methyl chloride has been evaporated, the practically neutral mixture is freed from dimethoxyethane and volatile by-products by distillation. Purification is effected by dialysis, and the product is isolated by lyophilization, as described in Example 2. The obtained trisubstituted β-CD ether has an average methyl DS of 1.1, a carboxymethyl DS of 0.41 and a hydroxypropyl MS of 0.33.

What is claimed is:

1. A water-soluble mixed ether of β-cyclodextrin wherein each ether substituent is a member selected from the group consisting of $C_1$ and $C_2$ alkyl, hydroxy($C_2$ to $C_4$)alkyl and carboxy($C_1$ and $C_2$)alkyl, with the proviso that the sole ether substituents are not the sole couple of hydroxyethyl and hydroxypropyl.

2. A mixed ether as claimed in claim 1 having a degree of substitution (DS) between 0.28 and 3.0 for each ether group.

3. A mixed ether as claimed in claim 2 wherein at least one ether substituent is methyl and at least one other ether substituent is hydroxyethyl.

4. A mixed ether as claimed in claim 2 wherein at least one ether substituent is methyl and at least one other ether substituent is hydroxypropyl.

5. A mixed ether as claimed in claim 2 wherein at least one ether substituent is methyl and at least one other ether substituent is carboxymethyl.

6. A mixed ether as claimed in claim 1 comprising at least two ether substituents selected from the group consisting of methyl, hydroxyethyl, hydroxypropyl and carboxymethyl.

7. A mixed ether as claimed in claim 1 wherein one of the ether substituents is methyl.

8. A mixed ether as claimed in claim 7 wherein each further ether substituent is a member selected from the group consisting of hydroxyethyl, hydroxypropyl and carboxymethyl.

9. A mixed ether as claimed in claim 8 having a degree of substitution (DS) between 0.28 and 3.0 for each ether group.

10. A process for preparing a mixed ether as claimed in claim 1, which comprises reacting $\beta$-cyclodextrin with at least two different alkylating, hydroxyalkylating and/or carboxyalkylating etherifying agents in a basic, liquid reaction medium containing an alkali-metal hydroxide and water.

11. A process as claimed in claim 10 wherein the reaction medium further contains organic solvent.

12. A process as claimed in claim 11, wherein the organic solvent comprises at least one member selected from the group consisting of a dialk($C_1$ to $C_3$)oxyethane, a $C_2$ to $C_5$ alkanol, a ($C_1$ to $C_4$)alkoxy($C_2$ or $C_3$)alkanol and an aliphatic ketone.

13. A process as claimed in claim 12, which comprises reacting the $\beta$-cyclodextrin with at least two different etherifying agents in one single step.

14. A process as claimed in claim 12, which comprises reacting the $\beta$-cyclodextrin with at least one etherifying agent in each of two steps.

15. A process as claimed in claim 10, wherein the etherifying agents comprise at least two etherifying agents selected from the group consisting of $C_1$ and $C_2$ alkyl chlorides, $C_2$ to $C_4$ alkylene oxides and $C_2$ and $C_3$ chloroalkane acids.

16. A process as claimed in claim 15, which comprises reacting the $\beta$-cyclodextrin with at least two different etherifying agents in one single step.

17. A process as claimed in claim 15, which comprises reacting the $\beta$-cyclodextrin with at least one etherifying agent in each of two steps.

18. A process as claimed in claim 10, which comprises reacting the $\beta$-cyclodextrin with at least two different etherifying agents in one single step.

19. A process as claimed in claim 10, which comprises reacting the $\beta$-cyclodextrin with at least one etherifying agent in each of at least two steps.

20. A process as claimed in claim 10 for preparing a mixed ether having a degree of substitution (DS) between 0.28 and 3.0 for each ether group.

* * * * *